Aug. 29, 1933.     O. U. ZERK     1,924,674
LUBRICATING APPARATUS
Filed May 19, 1930     2 Sheets-Sheet 1

Inventor
Oscar U. Zerk
By Williams Bradbury McCaleb & Hinkle
Attys

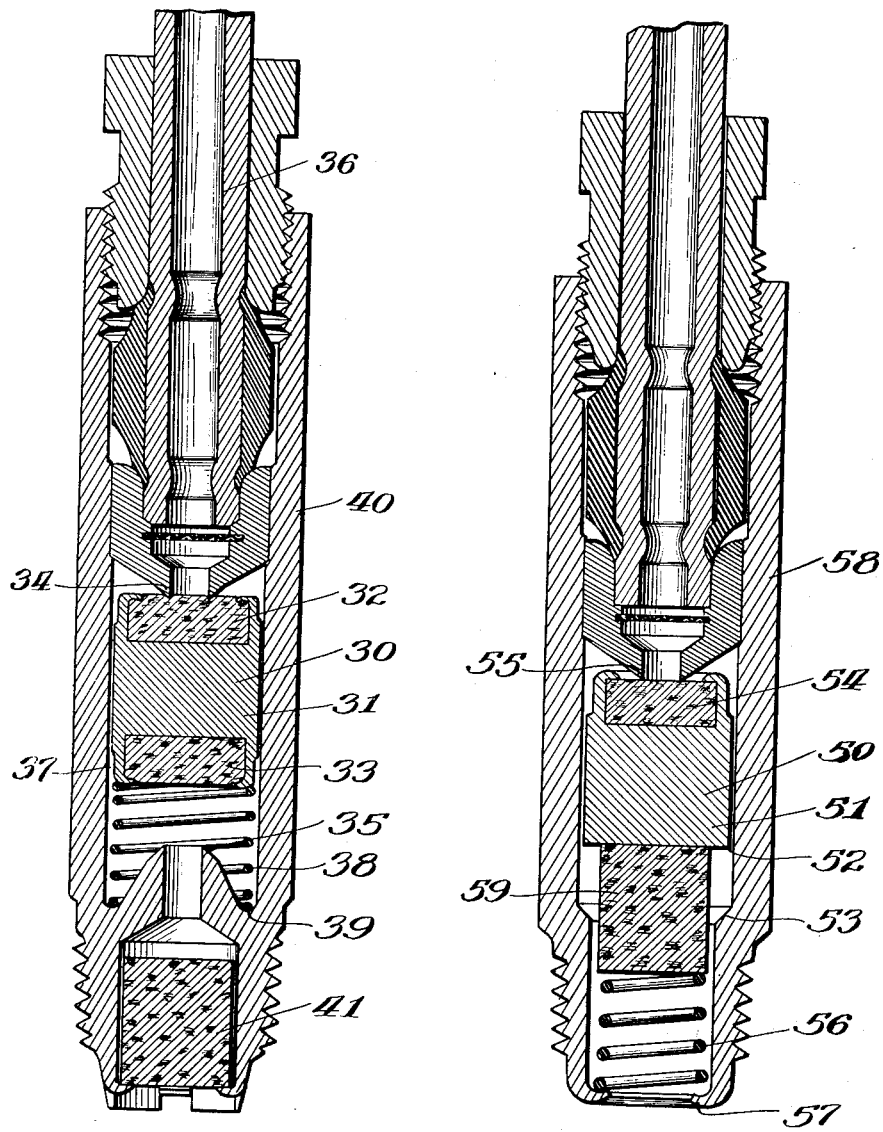

Patented Aug. 29, 1933

1,924,674

UNITED STATES PATENT OFFICE 1,924,674

LUBRICATING APPARATUS

Oscar U. Zerk, Chicago, Ill., assignor to Alemite Corporation, Chicago, Ill., a corporation of Delaware Application May 19, 1930. Serial No. 453,499

7 Claims. (Cl. 184—7)

My invention relates to lubricating apparatus and is more particularly concerned with metering devices especially adapted for use in centralized lubricating systems. Centralized lubricating systems comprise, in general, a source of lubricant supply, a pump in communication therewith and fed therefrom, a branched conduit system connecting the pump with a plurality of bearings requiring lubrication, and metering devices located in the various branches of the conduit system for measuring or apportioning the quantity of lubricant supplied to their respective bearings.

An object of my invention is to provide a new and improved metering device.

Another object is to provide a metering device which will accurately measure the amount of lubricant supplied to its bearing upon each application of pump pressure.

Another object is to provide a metering device which will continue to supply lubricant to its bearing some time after the cessation of pump pressure.

Another object is to provide a metering device which segregates a predetermined quantity of lubricant irrespective of the tightness or looseness of the bearing to which it is connected.

Other objects and advantages will become apparent as the description proceeds.

In the drawings

Figure 3 is a sectional elevation of a modified form of the invention; and

Figure 4 is a sectional elevation of a still further modification.

Figure 1:
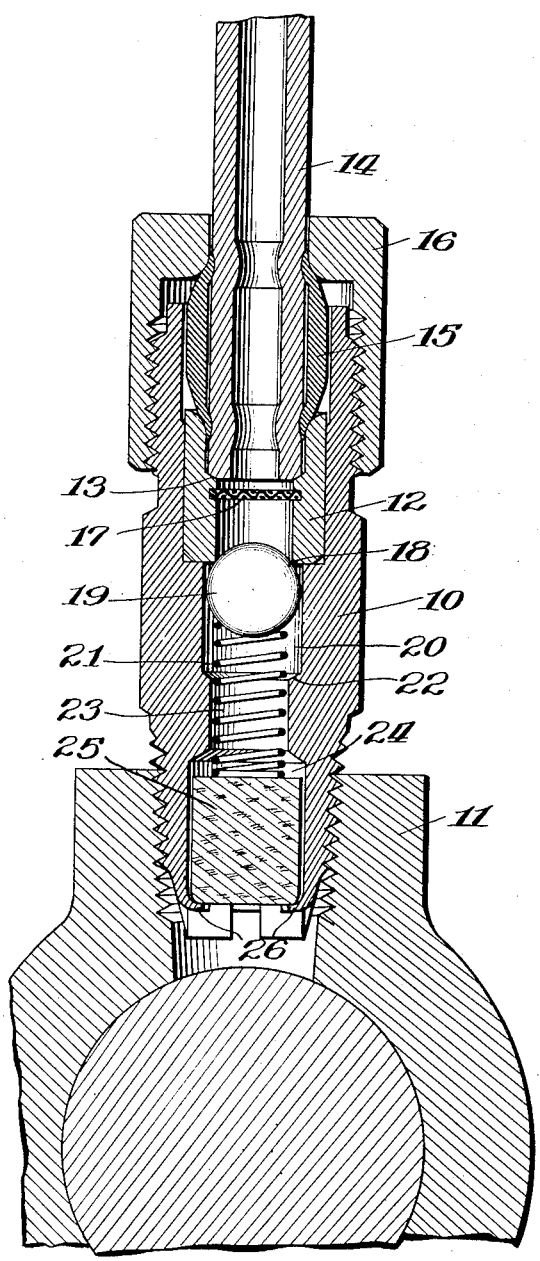
Figure 1 is a sectional elevation of one form of my invention, showing the parts in normal position.
Figure 2:
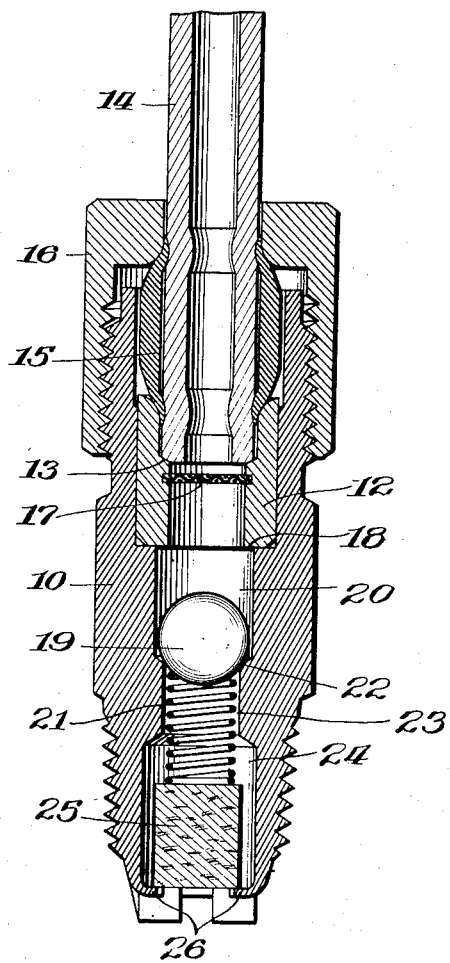
Figure 2 is a view similar to Figure 1 but showing the parts in a different position.

Referring, first, to Figures 1 and 2 of the drawings, 10 represents a tubular body threaded at its lower end for attachment to a bearing 11, or other suitable supporting part. A sleeve 12 is press fitted into the body 10 and has an internal shoulder 13 adapted to support one end of a lubricant supply conduit 14 which serves to connect the body 10 with a lubricant pump or other source of lubricant supply. A lubricant-tight connection is effected by means of a compression ring 15 confined between one end of the sleeve 12 and a cap 16 threadedly engaging the upper end of the body 10. As is well known in the art, screwing down of the cap 16 deforms the compression ring 15 and conduit 14, thereby securing a lubricant-tight interlocking connection which effectively prevents separation of the conduit 14 from the body 10.

The sleeve 12 carries a strainer 17 preferably consisting of a small disc of wire screening, and the lower end of the sleeve 12 forms a valve seat 18 for a ball valve 19 located in a chamber 20 and pressed against the valve seat by a spring 21. The lower end of the chamber 20 terminates at a second valve seat 22. The structure so far described is similar to that disclosed and claimed in my co-pending application, Serial No. 344,681, filed January 24, 1929.

A conduit 23 connects the chamber 20 with a second chamber 24 in which I locate a body 25 of cork or other suitable compressible and resilient material. The cork 25 substantially fills the chamber 24 and forms a support for one end of the spring 21. The cork 25 is retained in place by the fingers 26 struck out from the lower end of the body 10.

The operation of my invention is as follows: I will assume that the parts are in the position shown in Figure 1 and that the chamber 20, conduit 23 and that part of the chamber 24 not occupied by the cork 25 are filled with lubricant. Upon the application of pump pressure to the lubricant in the conduit 14 the ball valve 19 is moved from its upper seat 18 and forced downwardly in the chamber 20 until it makes contact with the seat 22. During the downward movement of the ball 19 the lubricant in the chamber 20 beneath the ball will be forced through the conduit 23 and into the chamber 24 where it will flow between the cork 25 and wall of the chamber and into the bearing 11. If the bearing 11 resists this inflow of lubricant an increase of pressure will occur in the chamber 24 and the cork 25 will shrink sufficiently to receive that part of the lubricant displaced from the chamber 20 which cannot be immediately accommodated by the bearing. When the ball 19 contacts with the valve seat 22 it forms an effective seal which prevents the lubricant supplied through the conduit 14 from passing into the conduit 23 and thence directly to the bearing.

Upon the cessation of pump operation the ball 19 is returned to the position shown in Figure 1 and during such return the lubricant in the chamber 20 in front of the ball by-passes around the ball and fills that part of the chamber 20 in rear thereof. Thereafter the cork 25 expands to its original size and during this expansion lubricant is displaced from the chamber 24 and forced into the bearing. The speed with which the cork 25 thus expands to its normal size will depend upon the resistance offered by the bearing.

In the modification shown in Figure 3 I have replaced the ball 19 by a valve 30 comprising a metal body 31 enclosing resilient discs 32 and 33 which co-act with valve seats 34 and 35, respectively. The valve seat 34 encloses an area materially smaller than the upper surface of the valve 30, thereby making it necessary to develop a relatively high pressure in the conduit 36 before the valve 30 is forced from the seat 34. As soon as the valve 30 leaves the seat 34 the entire upper surface of the valve is exposed to the pressure of the lubricant and the valve descends very rapidly in the chamber 37 until the disc 33 effects a seal with the lower valve seat 35. In this form of the invention the valve spring 38 rests upon a support 39 formed integrally with the body 40 instead of resting on the cork 41. This construction has the advantage of providing an immovable support for the valve spring 38 and thus insures a given spring force exerted against the valve 30 for any given position of the valve, regardless of the size of the cork 41 or other conditions of operation. The structure of the valve 30 and associated parts is generally similar to that disclosed and claimed in my co-pending application, Serial No. 334,682, filed January 24, 1929. The operation of this embodiment of the invention is similar to the operation of the embodiment shown in Figures 1 and 2.

In the modification shown in Figure 4 I use a slightly different valve 50 comprising a metal body 51 having a lower edge 52 adapted to contact with a valve seat 53 and carrying a resilient disc 54 which contacts with an upper valve seat 55. In this form of the invention the valve spring 56 rests on an inturned flange 57 located at the lower end of the tubular body 58, and a compressible resilient body 59 of cork or other suitable material is interposed between the valve spring 56 and the valve 50. The operation of this form of the invention is similar to the operation of the forms previously described.

While I have illustrated and described several preferred embodiments of my invention, it is to be understood that various changes and modifications may be made therein without departing from the scope of my invention which is defined solely by the following claims.

What I claim and desire to secure by United States Letters Patent is:

1. In lubricating apparatus of the class described, a tubular body having two chambers therein, one of said chambers having a valve seat at each end thereof, a valve located in said chamber between said valve seats, said valve being of slightly smaller diameter than said chamber, a spring for holding said valve against one of said seats, a conduit connecting said two chambers, a resilient body of compressible homogeneous material in the other chamber, means for connecting said first named chamber with a source of lubricant supply, and means for connecting said second chamber with a part requiring lubrication.

2. In lubricating apparatus of the class described, a tubular body having two chambers therein, one of said chambers having a valve seat at each end thereof, a valve located in said chamber between said valve seats, said valve being of slightly smaller diameter than said chamber, a spring for holding said valve against one of said seats, a conduit connecting said two chambers, a cork body in the other chamber, means for connecting said first named chamber with a source of lubricant supply, and means for connecting said second chamber with a part requiring lubrication.

3. In lubricating apparatus of the class described, a metering device comprising, in combination, a first chamber having an inlet and a outlet, means for connecting said inlet with a source of lubricant supply, a valve seat in said inlet, a valve in said chamber of slightly smaller cross section than said chamber, a spring normally holding said valve against said valve seat, a second valve seat at said outlet, a conduit connecting said outlet with a second chamber, a resilient body of compressible homogeneous material in said second chamber, and means connecting said second chamber with a part requiring lubrication.

4. In lubricating apparatus of the class described, a metering device comprising, in combination, a first chamber having an inlet and an outlet, means for connecting said inlet with a source of lubricant supply, a valve seat in said inlet, a valve in said chamber of slightly smaller cross section than said chamber, a spring normally holding said valve against said valve seat, a second valve seat at said outlet, a conduit connecting said outlet with a second chamber, a cork body in said second chamber, and means connecting said second chamber with a part requiring lubrication.

5. In lubricating apparatus of the class described, a metering device comprising means for segregating a predetermined quantity of lubricant, conduit means for conducting the lubricant thus segregated to a part requiring lubrication, and a resilient body of inherently compressible homogeneous material in said conduit means adapted upon subjection to pressure to shrink and provide space for holding that part of a segregated quantity of lubricant in excess of the immediate needs of said part.

6. In lubricating apparatus of the class described, a metering device comprising means for segregating a predetermined quantity of lubricant, conduit means for conducting the lubricant thus segregated to a part requiring lubrication, and a cork body in said conduit means adapted upon subjection to pressure to shrink and provide space for holding that part of a segregated quantity of lubricant in excess of the immediate needs of said part.

7. In lubricating apparatus of the class described, a metering device comprising a tubular body having a socket in one end thereof adapted to receive an end of a lubricant supply conduit, means for effecting a lubricant-tight connection between a lubricant supply conduit and said body, a strainer mounted in said body adjacent said socket, a valve chamber adjacent said strainer, said chamber and strainer being in communication with said conduit, said valve chamber having valve seats at opposite ends thereof, a valve reciprocable between said seats, a conduit connecting said valve chamber with a second chamber, a cork body substantially filling said second chamber, a spring for urging said valve against one of said seats, said spring being supported by said cork body, and means for attaching said tubular body to a bearing requiring lubrication.

OSCAR U. ZERK.